United States Patent
Dahl et al.

(10) Patent No.: US 12,024,440 B2
(45) Date of Patent: Jul. 2, 2024

(54) INTRODUCTION OF TITANIUM HOMOGENEOUSLY INTO A SOLID MATERIAL

(71) Applicant: TOPSOE BATTERY MATERIALS A/S, Kgs. Lyngby (DK)

(72) Inventors: Søren Dahl, Hillerød (DK); Jon Fold Von Bülow, Copenhagen (DK); Rainer Küngas, Copenhagen (DK); Anni Stahl, Lynge (DK); Peter Axmann, Ulm (DE); Gisela Arnold, Ulm (DE); Claudia Pfeifer, Ulm (DE); Wolfgang Weirather, Ulm (DE)

(73) Assignee: TOPSOE BATTERY MATERIALS A/S, Kgs. Lyngby (DK)

( * ) Notice: Subject to any disclaimer, the term of this patent is extended or adjusted under 35 U.S.C. 154(b) by 476 days.

(21) Appl. No.: 16/640,772

(22) PCT Filed: Aug. 15, 2018

(86) PCT No.: PCT/EP2018/072135
§ 371 (c)(1),
(2) Date: Feb. 21, 2020

(87) PCT Pub. No.: WO2019/038157
PCT Pub. Date: Feb. 28, 2019

(65) Prior Publication Data
US 2021/0024370 A1 Jan. 28, 2021

(30) Foreign Application Priority Data

Aug. 23, 2017 (DK) .................. 2017 00460

(51) Int. Cl.
*C01G 53/06* (2006.01)
*C01G 53/00* (2006.01)
*H01M 4/04* (2006.01)
*H01M 4/36* (2006.01)
*H01M 4/58* (2010.01)
*H01M 10/39* (2006.01)
*H01M 4/02* (2006.01)

(52) U.S. Cl.
CPC ........... *C01G 53/06* (2013.01); *C01G 53/006* (2013.01); *H01M 4/0471* (2013.01); *H01M 4/364* (2013.01); *H01M 4/58* (2013.01); *H01M 10/3918* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 10,109,857 B2 * | 10/2018 | Iwata | C01G 45/02 |
| 2009/0148772 A1 | 6/2009 | Kawasato et al. | |
| 2009/0186953 A1 | 7/2009 | Gesenhues et al. | |
| 2014/0034872 A1 * | 2/2014 | Watanabe | C01G 51/54 |
| | | | 429/223 |
| 2015/0221932 A1 | 8/2015 | Sawada et al. | |
| 2017/0309894 A1 * | 10/2017 | Hu | C01G 53/006 |

FOREIGN PATENT DOCUMENTS

| | | |
|---|---|---|
| CN | 106058218 A | 10/2016 |
| EP | 3093272 A1 | 11/2016 |
| JP | 2004349109 A * | 12/2004 |

OTHER PUBLICATIONS

CN1060585218A English translation from google patents (Year: 2016).*
Cho et al., Effect of synthesis condition on the structural and electrochemical properties of Li[Ni1/3Mn1/3Co1/3]O2 prepared by carbonate co-precipitation method, Journal of Power Sources, vol. 142, Issues 1-2, 2005, pp. 306-312 (Year: 2005).*
Danish Search Report dated Feb. 1, 2018 for corresponding Danish priority application No. PA 2017 00460.
International Search Report (PCT/ISA/210) issued on Nov. 21, 2018, by the European Patent Office as the International Searching Authority for International Application No. PCT/EP2018/072135.
Written Opinion (PCT/ISA/237) issued on Nov. 21, 2018, by the European Patent Office as the International Searching Authority for International Application No. PCT/EP2018/072135.
Lee et al., Preparation and characterization of nano-crystalline LiNi0:5Mn1:5O4 for 5 V cathode material by composite carbonate process, Electrochem. Commun. 4 (2002), 989-994.

* cited by examiner

*Primary Examiner* — Lucas J. O'Donnell
(74) *Attorney, Agent, or Firm* — Boone IP Law

(57) ABSTRACT

The invention relates to a method for the precipitation of a solid material, where the method comprises: providing an aqueous metal ion solution, said metal ion solution comprising $TiOSO_4$ and metal ions of a metal M, where M is one or more of the elements: Mg, Co, Cu, Ni, Mn, Fe; providing an aqueous carbonate solution; and mixing said aqueous metal ion solution and said aqueous carbonate solution thereby providing a solid material comprising titanium and a metal carbonate comprising said metal(s) M, where the titanium is homogeneously distributed within the solid material. The invention also relates to a solid material, a method of preparing a positive electrode material for a secondary battery from the solid material and the use of the solid material as a precursor for the preparation of a positive electrode material for a secondary battery.

8 Claims, No Drawings

INTRODUCTION OF TITANIUM HOMOGENEOUSLY INTO A SOLID MATERIAL

TECHNICAL FIELD

The invention relates to a method for the precipitation of a solid material, a solid material prepared by the method of the invention as well as a method of preparing a positive electrode material for a secondary battery from the solid material of claims.

BACKGROUND OF THE INVENTION

Limited oil and gas reserves together with an increasing effort to reduce the amount of $CO_2$ emission not only cause a shift in electric energy production towards renewable forms of energy, but also result in increasing research for alternative drive trains in the automotive industry. Moreover, an increasing demand for durable high power storage media within consumer electronics and telecommunication promotes both improvement of existing energy storage systems and development of new energy storage systems with the main focus on efficiency, cost reduction and safety.

Due to its high gravimetric energy storage capability, the lithium ion battery (LiB) is a promising system, not only for current and future energy storage solutions, but also for use in automobiles and in a large variety of other special fields of application. Another advantage of LiB is the abundance of the necessary elements in the Earth crust securing long term availability and cost reduction, due to which materials comprising manganese are of great interest.

The sodium acting as the active ionic species in sodium-ion batteries (NaB) is cheaper and more abundant than lithium. This makes NaB a cost-effective alternative to LiB, especially for applications where weight and energy density are of minor importance such as grid energy storage for renewable energy sources (e.g. wind- and solar power). Moreover, NaB have promising electrochemical features in terms of charge-discharge performance, reversibility, Coulombic efficiency and high specific discharge capacity. LiB is a widely used rechargeable battery type, and thus the use of NaB—if successfully made into a low cost alternative—is expected to grow substantially in the future.

When preparing multi-element secondary electrode materials, e.g. comprising Ni, Mn Co, Al, Mg, Ti and/or Fe, it is necessary to mix raw materials of the various elements together before fusing them in a high temperature heat treatment process. This is generally achieved using various mixing machinery in wet or dry state or by co-precipitation of the elements from soluble salts. Here, the term "co-precipitation" is meant to denote the simultaneous precipitation of a solid material containing multiple metals from a solution. An advantage of the co-precipitation method is the resultant homogeneous atomic mixing of the elements in a solid material that may be hard to obtain in other ways.

The co-precipitation of Mn, Ni and Co is well-known. The addition of small amounts of other transition metals, such as e.g. Fe, Cu, V, Ti, has been described to a lesser degree. The introduction of these elements in positive electrode materials for secondary batteries has been reported to improve material properties in terms of e.g. long term cycling stability. Incorporating Ti into the material, so that the Ti is distributed homogeneously is non-trivial.

Surprisingly and unexpectedly, it has turned out that a precipitation route where the metal constituents of battery material are precipitated as carbonate precursor has been considerably more advantageous than other preparation routes (solid state synthesis, precipitation as other species, notably hydroxides). Specifically, it has been found that Ti can be homogeneously distributed in the precipitated solid material, if $TiOSO_4$ is used as the source for Ti during carbonate precipitation.

It is an object of the invention to provide a method for the precipitation of a solid material, where titanium is homogeneously distributed within the solid material. It is a further object of the invention to provide a solid material where titanium is homogeneously distributed within the solid material. It is a further object of the invention to provide a method of preparing a LiB or NaB positive electrode material for a secondary battery from the solid material.

DISCLOSURE OF THE INVENTION

The invention relates to a method for the precipitation of a solid material, the method comprising:
  providing an aqueous metal ion solution, where the metal ion solution comprises $TiOSO_4$ and metal ions of a metal M, where M is one or more of the elements: Mg, Co, Cu, Ni, Mn, Fe;
  providing an aqueous carbonate solution; and
  mixing said aqueous metal ion solution and said aqueous carbonate solution thereby providing a solid material comprising titanium and a metal carbonate comprising said metal(s) M, where the titanium is homogeneously distributed within the solid material.

As used herein, the term "X is homogeneously distributed within Y" is meant to denote a homogeneous atomic mixing of X and Y. Thus, X is homogeneously distributed within Y on a scale of about 10 to 20 nm, so that when a sample of the material containing X and Y is taken out, where the sample has an extent of 10 to 20 nm, the composition of the sample is the same, no matter from which part of the material the sample has been taken out.

By using a metal ion solution comprising titanyl sulfate, $TiOSO_4$, together with metal ions of the metal M it has turned out that material properties can be improved by decreasing the scale at which titanium is homogeneously distributed within the precipitated solid material. When titanium is dissolved into an aqueous metal solution, the titanium is co-precipitated within the precipitated material so that an atomic mixing of titanium within the solid material comprising $MCO_3$ is obtained. Thus, the method of the invention ensures that the titanium is distributed evenly or homogeneously throughout the solid material. This is an advantage compared to materials wherein titanium has been impregnated into the materials; here, the titanium is typically concentrated in certain regions of the material, e.g. at the surface of the particles constituting the solid material.

It is also an advantage compared to materials wherein titanium nanoparticles such as $TiO_2$ has been incorporated into the materials by using a dispersion of the particles (also known as a sol) in the process; here, the titanium is concentrated in particles within the material resulting in an enlargement of the scale at which titanium is homogeneously distributed within the precipitated solid material.

It should be noted that the term "providing a solid material" is meant to denote the provision of a precipitate. Typically, the precipitate/solid material is dispersed in a slurry and is subsequently settled, dried and/or subjected to other treatments. Thus, the provision of a solid material dispersed in a slurry is meant to be covered by the term "providing a solid material".

Moreover, the term "a metal carbonate comprising said metal(s) M" is meant to denote any relevant carbonate, $M(CO_3)_x$ where $1 \leq x \leq 2$, depending on the composition of metal(s) M from the elements Ni, Mn, Co, Mg, Cu, Fe and mixtures thereof.

Furthermore, it is stressed, that the term "carbonate solution" is meant to denote any appropriate carbonate solution, so that a carbonate solution mixed with e.g. a small amount of hydroxide solution is still to be considered a carbonate solution.

In an embodiment, the metal ion solution comprises $Mg^{2+}$ ions and metal ions of a metal M', where M' is one or more of the elements: Co, Cu, Ni, Mn, Fe. Thus, the solid material comprises $MgM'(CO_3)_x$ and titanium is mixed homogeneously into the structure of the carbonate $MgM'(CO_3)_x$.

In an embodiment, M contains Ni, Mn and Mg. In this embodiment, the solid material has an overall composition such that the atomic ratio between Ti and Ni, Mn and Mg, Ti:M, is between $0<Ti:M\leq0.2$, and titanium is mixed homogeneously into the structure of the carbonate of the solid material. In the ratio Ti:M, the amount of M is seen as the sum of the amounts of the individual elements Ni, Mn and Mg, so that for each atom of Ni, Mn or Mg, the solid material comprises between 0 (not included) and 0.2 (included) atoms of Ti. An example of such a material is e.g. $Ni_aMn_bMg_cTi_{1-a-b-c}(CO_3)_x(OH)_{2-2x}$, where $0<a+b+c<1$ and $0<x\leq1$.

In an embodiment, the metal ion solution is prepared from sulfate(s), nitrate(s) or acetate(s). The anions mentioned here (sulfate, nitrate, acetate) are currently the most commonly used. The choice of anion depends on price and availability of the specific metal salt and is not a limiting factor.

In an embodiment, the method is carried out without the use of a chelating agent. In particular, the metal ion solution or the carbonate solution contains no chelating agent, nor is any chelating agent added into the reactor via a separate feed. When the method is carried out without the use of a chelating agent, the resulting solid material does not contain any trace of such a chelating agent.

It is well-known to use chelating agents in precipitation of solid materials for positive electrodes for secondary batteries. One way of preparing solid materials for LNMO-type LiB positive electrode materials is to precipitate the mixture of Ni and Mn as hydroxides, i.e. $Ni_yMn_{2-y}(OH)_4$, where $0\leq y\leq0.5$. Such precipitation commonly uses the corresponding transition metal sulfates and NaOH as starting materials and ammonia (NH3, NH4OH or NH3·H2O) as chelating agent. Other commonly used chelating agents include but are not limited to NH4CO3, citric acid, glycolic acid, oxalic acid, polyacrylic acid, malonic acid, and EDTA. The terms "chelating agents", "complexing agents", and "ligands" are seen as synonyms. The chelating agent is generally believed to have the function of inducing and controlling the growth of the precursor so that the desired morphology is obtained. However, the method of the invention has shown to succeed without any such chelating agent.

There are several disadvantages related to the use of chelating agents such as ammonia in the precipitation process. Firstly, chelating agents form complexes with manganese and nickel and other ions, increasing the solubility of these metals in the solution. This means that more metal ions will inevitably remain in solution during precipitation and thus, more starting material will have to be used to produce a certain amount of carbonate precursor compared to when no chelating agent is used. Secondly, since the chelating ability of the various chelating agents varies as a function of pH and temperature, the elemental composition and ratio between metals in the carbonate precipitate will also change as a function of pH and temperature, making the process more difficult to control. Thirdly, in a large-scale production facility, any used chelating agent needs to be recycled for environmental and economic reasons, typically via an ammonia stripping process, adding further complexity to the production process. Fourthly, the handling of some chelating agents, such as ammonia, is hazardous and costly. Fifthly, the use of volatile chelating agents, such as ammonia, requires the precipitation reaction to be carried out in a gas tight reactor system.

In an embodiment, the solid material is precipitated and agglomerated into agglomerated particles, wherein D50 of said agglomerated particles is between 1 and 50 μm, preferably between 6 and 40 μm.

One way to quantify the size of particles in a slurry or a powder is to measure the size of a large number of particles and calculate the characteristic particle size as a weighted mean of all measurements. Another way to characterize the size of particles is to plot the entire particle size distribution, i.e. the volume fraction of particles with a certain size as a function of the particle size. In such a distribution, D10 is defined as the particle size where 10% of the population lies below the value of D10, D50 is defined as the particle size where 50% of the population lies below the value of D50 (i.e. the median), and D90 is defined as the particle size where 90% of the population lies below the value of D90. Commonly used methods for determining particle size distributions include laser scattering measurements and scanning electron microscopy measurements, coupled with image analysis. When the solid material is agglomerated into agglomerated particles having a D50 of between 1 and 50 μm it is suited as a solid material for sodiation or lithiation into a positive electrode material for secondary batteries.

Typically, the distribution of the size of the agglomerated particles is characterized in that the ratio between D90 and D10 is smaller than or equal to 10. D90 and D10 are here measures of a volume based particle size distribution. A ratio between D90 and D10 of D90:D10=10 covers e.g. the examples where D90=20 μm and D10=2 μm and D90=10 μm and D10=1 μm. Preferably, the ratio between D90 and D10, D90:D10, is lower than 10, such as e.g. 5 or 4. When the ratio D90:10 is smaller than or equal to 10, it is achieved that the particle size distribution is relatively narrow. Thus, the agglomerated particles are relatively equal in size and are thus well-suited as solid material for sodiation or lithiation into positive electrode material for secondary batteries.

In an embodiment, the agglomerated particles are essentially spherical. In an embodiment, the agglomerated particles are characterized by an average circularity higher than 0.90 and simultaneously an average aspect ratio lower than 1.50. There are several ways to characterize and quantify the sphericity and shape of particles. Almeida-Prieto et al. in *J. Pharmaceutical Sci.*, 93 (2004) 621, lists a number of form factors that have been proposed in the literature for the evaluation of sphericity: Heywood factors, aspect ratio, roughness, pellips, rectang, modelx, elongation, circularity, roundness, and the Vp and Vr factors proposed in the paper. Circularity of a particle is defined as $4\cdot\pi\cdot(Area)/(Perimeter)^2$. An ideal spherical particle will thus have a circularity of 1, while particles with other shapes will have circularity values between 0 and 1. Particle shape can further be characterized using aspect ratio, defined as the ratio of particle length to particle breadth, where length is the maximum distance between two points on the perimeter and breadth is the maximum distance between two perimeter points linked by a line perpendicular to length.

In an embodiment, the pH value of the mixed aqueous metal ion solution and aqueous carbonate solution is 7.5<pH<10.0, preferably the pH value is 8.0<pH<10.0, more preferably the pH value is 8.5<pH<10.0, even more preferably the pH value is 9.0<pH<10.0. These pH values have proved to provide for good product qualities of the precipitated solid material. pH values below 10 are indicative of the precipitation of a carbonate product.

In general, more neutral pH values are safer to handle compared to higher pH values, such as pH values above 10.

In an embodiment, the method further comprises the step of providing a NaOH solution and mixing the NaOH solution with the aqueous metal ion solution and the aqueous carbonate solution. By mixing NaOH with the aqueous metal ion solution and the aqueous carbonate solution to a reaction mixture, it is possible to control the pH value of this reaction mixture. It has turned out that the pH value of the reaction mixture is important in obtaining a solid material with the desired particle size distribution and/or sphericity of the agglomerated particles.

Another aspect of the invention relates to a solid material prepared by the method according to the invention, where the solid material comprises titanium as well as a metal carbonate comprising said metal(s), where M is one or more of the elements: Mg, Co, Cu, Ni, Mn, Fe, wherein the titanium is homogeneously distributed within the solid material.

In an embodiment, the solid material has an overall composition such that the atomic ratio Ti:M between titanium and said metal(s) M is 0<Ti:M≤0.2.

In an embodiment, Ti is present in the solid material as an oxide, a hydroxide, a carbonate or mixtures thereof. Thus, typically Ti is not an integral part of the crystal structure of the metal carbonate; instead Ti forms an oxide, a hydroxide, a carbonate or mixtures thereof, where this/these oxide, hydroxide, carbonate or mixture thereof is embedded in the metal carbonate structure. Such Ti oxides, Ti hydroxides and Ti carbonates all have a size that is in the magnitude of some nanometers, e.g. less than 10 nm. Many Ti oxides, Ti hydroxides and Ti carbonates are conceivable, such as TiO, $Ti_2O$, $Ti_2O_3$, $TiOCO_3$, $Ti(OH)_4$, etc.

Advantages of these and further embodiments corresponds to advantages of the method described above. Therefore, these advantages will not be described here in further details.

A further aspect of the invention relates to a method of preparing a positive electrode material for a secondary battery from the solid material of the invention. The method comprises the steps of: mixing the solid material comprising titanium as well as a metal carbonate comprising said metal(s) M with a starting material comprising Li or Na; sintering the solid material and the starting material, thereby partly or fully decomposing said solid material and said starting material comprising Li or Na, and thereby forming a LiB or NaB positive electrode material, respectively. Typically, the Li or Na in the starting material is in the form of a carbonate.

Yet another aspect of the invention relates to the use of the solid material according to the invention as a precursor for the preparation of positive electrode material for a secondary battery after lithiation or sodiation of the solid material.

EXAMPLES

In the following a number of examples are described. Each example describes an experiment. In the examples, specific molarities, temperatures and CSTR parameters are indicated; however, these should not be seen as limiting the invention since the experiments indicate a larger process window allowing similar materials to be synthesized with variation of i.a. molarities, temperatures and CSTR parameters.

Example 1

Precipitation of Titanium(IV) Oxysulfate and Metal Sulfate with Carbonate

Embodiment of the Invention

A material with the proposed formula $Ni_aMn_bMg_cTi_{1-a-b-c}(CO_3)_x(OH)_{2-2x}$ (with 0<a+b+c<1 and 0<x≤1) can be synthesized by an aqueous co-precipitation process in a continuous stirred tank reactor (CSTR), which has been described and illustrated elsewhere [Schmidt, Lanny D. (1998). The Engineering of Chemical Reactions. New York: Oxford University Press].

A continuous stirred tank reactor (CSTR) where reactants and products are continuously added and withdrawn is the idealized opposite of the well-stirred batch and tubular plug-flow reactors. In practice, mechanical or hydraulic agitation is required to achieve uniform composition and temperature, a choice strongly influenced by process considerations.

In this example, a 0.5 L CSTR is initially filled with distilled water corresponding to 20 vol. % of the reactor and adjusted to a pH of 9 by adding appropriate amounts of $Na_2CO_3$.

A metal salt solution comprising Ni, Mn, Mg and Ti ions with a total concentration of 2.2 M, is prepared by dissolving appropriate amounts of $NiSO_4$, $MnSO_4$, $MgSO_4$ and $TiOSO_4$ in deionized water. Total concentrations other than 2.2 M can be used, as long as the concentration is approximately 0.1 M below the solubility limit for the metal salts.

The metal salt solution is subsequently pumped into a CSTR. In order to precipitate the metal cations, a 2.08 M basic solution of $Na_2CO_3$ is simultaneously pumped separately into the CSTR. The addition of extra base in the form of 7.66 M NaOH in a separate feed can be employed to compensate for the acidity of the $TiOSO_4$.

No chelating agent such as ammonium hydroxide or ammonium carbonate is required.

The solution is stirred at 900 rpm and the temperature of the solution is maintained at 30° C. by circulating hot water through a jacket in the CSTR.

The total feed flow rate is adjusted to 160 mL/hour assuring an average residence time (reactor volume divided by the total flow rates) of around 3 hours in the CSTR.

At the initial stage of the co-precipitation reaction, irregular secondary particles from the agglomeration of primary precipitated structures were formed. These irregular particles change gradually into spherical particles during the process.

Hence, a total of 6 residence times is passed before the product can be collected.

The resulting liquid dispersion that overflowed from the CSTR is feed into another reactor for an aging step, which is kept at the same reaction conditions as the CSTR.

Finally, the solid precipitate can be collected by filtration, washing and drying at 110° C. for 12 h to obtain the solid material.

The solid material consists of spherical particles less than 30 μm with a low amount of sulfur residue impurities. The spherical morphology is preserved upon drying and heating to 900° C.

Example 2

Precipitation of Metal Sulfate with Carbonate

Comparative Example

A material with the proposed formula $Ni_aMn_bMg_{1-a-b}(CO_3)_x(OH)_{2-2x}$ (with $0<a+b<1$ and $0<x\leq 1$) can be synthesized by an aqueous co-precipitation process in a continuous stirred tank reactor (CSTR) [see EXAMPLE 1 for references].

In this example, specific molarities, temperatures and CSTR parameters are mentioned, but experiments indicate a larger process window allowing similar materials to be synthesized with variations of these parameters.

In this example, a 1.0 L CSTR is initially filled with distilled water corresponding to 50 vol. % of the reactor and adjusted to a pH of 9.3 by adding appropriate amounts of $Na_2CO_3$.

A metal salt solution comprising Ni, Mn, and Mg with a total concentration of 2.0 M (total concentrations other than 2.2 M can be used, as long as the concentration is approximately 0.1 M below the solubility limit for the metal salts), is prepared by dissolving appropriate amounts of $NiSO_4$, $MnSO_4$, and $MgSO_4$ in deionized water.

The metal salt solution is then pumped into a CSTR. In order to precipitate the metal cations, a 2.1 M basic solution of $Na_2CO_3$ is simultaneously pumped separately into the CSTR.

No chelating agent such as ammonium hydroxide or ammonium carbonate is required.

The solution is stirred at 650 rpm and the temperature of the solution is maintained at 40° C. by circulating hot oil through a jacket in the CSTR.

The total feed flow rate is adjusted to 260 mL/hour assuring an average residence time (reactor volume divided by the total flow rates) of around 4 hours in the CSTR.

At the initial stage of the co-precipitation reaction, irregular secondary particles from the agglomeration of primary precipitated structures were formed. These irregular particles change gradually into spherical particles during the process.

Hence, a total of 2 residence times is passed before the product can be collected.

The resulting liquid dispersion that overflowed from the CSTR is feed into another reactor for an aging step, which is kept at the same reaction conditions as the CSTR.

Finally, the solid precipitate can be collected by filtration, washing and drying at 110° C. for 12 h to obtain the solid material.

The solid material consists of spherical particles less than 30 μm with a low amount of sulfur residue impurities. The spherical morphology is preserved upon drying and heating to 900° C.

Comparison of Example 1 and Example 2: X-Ray Diffraction Data from Precipitation of Metal Sulfate with and without Titanium(IV) Oxysulfate The X-ray diffractograms of two materials made by co-precipitation with and without $TiOSO_4$ as described in EXAMPLE 1 and EXAMPLE 2 has been compared. The comparison revealed two important discoveries related to this invention. The first is that the material made by co-precipitation with $TiOSO_4$ did not reveal any diffraction peaks related to $TiO_2$, meaning that the co-precipitated Ti is in the form of very small or amorphous crystallites. The second is that the metal carbonate crystallites observed in the diffractogram (peaks matching Rhodochrosite) are much wider and less pronounced in the material with Ti compared to than in the material without Ti. This means that the crystalline domains of the metal carbonate phase are much smaller in the material with Ti compared to the material without Ti. These two discoveries serve to emphasize the homogeneous distribution of titanium that can be achieved with this invention.

Example 3

Precipitation of Titanium(IV) Oxysulfate and Metal Sulfate with Hydroxide

Comparative Example

A material with the proposed formula $Ni_aMn_bMg_cTi_{1-a-b-c}(OH)_2$ (with $0<a+b+c<1$) can be synthesized by an aqueous co-precipitation process in a continuous stirred tank reactor (CSTR) (see EXAMPLE 1 for further details).

In this example, specific molarities, temperatures and CSTR parameters are mentioned, but experiments indicate a larger process window allowing similar materials to be synthesized with variations of these parameters.

In this example, a 1.35 L CSTR is initially filled with distilled water corresponding to 20 vol. % of the reactor and adjusted to a pH of 8 by adding appropriate amounts of NaOH.

A metal salt solution comprising Ni, Mn, Mg and Ti with a total concentration of 2.2 M (can be 0.1 M up to solubility limit for the metal salts), is prepared by dissolving appropriate amounts of $NiSO_4$, $MnSO_4$, $MgSO_4$ and $TiOSO_4$ in deionized water.

The metal salt solution is then pumped into a CSTR. In order to precipitate the metal cations, a 7.6 M basic solution of NaOH is simultaneously pumped separately into the CSTR. The addition of extra base in the form of increased flow of the NaOH feed can be employed to compensate for the acidity of the $TiOSO_4$.

No chelating agent such as ammonium hydroxide or ammonium carbonate is required.

The solution is stirred at 450 rpm and the temperature of the solution is maintained at 70° C. by circulating hot water through a jacket in the CSTR.

The total feed flow rate is adjusted to 400 mL/hour assuring an average residence time (reactor volume divided by the total flow rates) of a little over 3 hours in the CSTR.

At the initial stage of the co-precipitation reaction, irregular secondary particles from the agglomeration of primary precipitated structures were formed. Even after an extended number of dwell times, these irregular particles did not completely change into spherical particles.

The resulting liquid dispersion that overflowed from the CSTR is feed into another reactor for an aging step, which is kept at the same reaction conditions as the CSTR.

Finally, the solid precipitate can be collected by filtration, washing and drying at 110° C. for 12 h to obtain the solid material.

The solid material consists of a mixture of spheroidal and irregular particles less than 10 μm with a high amount of sulfur residue impurities. The morphology is preserved upon drying but assembles into larger irregular agglomerates upon heating to 900° C.

Example 4

Precipitation of Titanium(III) Chloride and Metal Nitrate with Carbonate

Comparative Example

A material with the proposed formula $Ni_aMn_bMg_cTi_{1-a-b-c}(CO_3)_x(OH)_{2-2x}$ (with $0<a+b+c<1$ and $0<x\leq1$) can be synthesized by an aqueous co-precipitation process in a continuous stirred tank reactor (CSTR) [See EXAMPLE 1 for details].

In this example, specific molarities, temperatures and CSTR parameters are mentioned, but experiments indicate a larger process window allowing similar materials to be synthesized with variations of these parameters.

In this example, a 0.5 L CSTR is initially filled with distilled water corresponding to 20 vol. % of the reactor and adjusted to a pH of 9 by adding appropriate amounts of NaOH.

Two separate metal salt solutions are prepared. The first comprising Ni, Mn, and Mg with a total concentration of 1.38 M (can be 0.1 M up to solubility limit for the metal salts), is prepared by dissolving appropriate amounts of $Ni(NO_3)_2$, $Mn(NO_3)_2$, and $Mg(NO_3)_2$ in deionized water. The second comprising Ti in a concentration of 1.3 M (can be 0.1 up to solubility limit for the metal salts) is prepared by dissolving appropriate amounts of $TiCl_3$ in deionized water.

The two metal salt solutions are then simultaneously pumped into a CSTR. In order to precipitate the metal cations, a 5.87 M basic solution of $Na_2CO$ is simultaneously pumped separately into the CSTR.

No chelating agent such as ammonium hydroxide or ammonium carbonate is required.

The solution is stirred at 900 rpm, and the temperature of the solution is maintained at 50° C. by circulating hot water through a jacket in the CSTR.

The total feed flow rate is adjusted to 240 mL/hour assuring an average residence time (reactor volume divided by the total flow rates) of around 2 hours in the CSTR.

At the initial stage of the co-precipitation reaction, irregular secondary particles from the agglomeration of primary precipitated structures were formed. Even after an extended number of residence times, these irregular particles did not completely change into spherical particles.

The resulting liquid dispersion that overflowed from the CSTR is feed into another reactor for an aging step, which is kept at the same reaction conditions as the CSTR.

Finally, the solid precipitate can be collected by filtration, washing and drying at 110° C. for 12 h to obtain the solid material. Upon filtration it is noticed that the mother liquor has a strong green hue indicating that not all the metals could be precipitated under these conditions.

The solid material consists of irregular particles less than 10 μm.

Example 5

Preparing a Positive Electrode Material for a Na-Ion Battery

Embodiment of the Invention

To describe a further aspect of the invention, two positive electrode material for Na-ion batteries were prepared using the solid material resulting from EXAMPLE 1 and EXAMPLE 2 in order to compare their electrochemical performance.

The solid material from EXAMPLE 1 comprising titanium as well as a metal carbonate comprising Ni, Mn and Mg was mixed thoroughly with a $Na_2CO3$ slurry. The $Na_2CO3$ slurry was prepared by paint-shaking $Na_2CO_3$ in pure ethanol with zirconia balls in the ratio of $Na_2CO_3$ to zirconia balls of 1:5 by weight for 30 min. The mixture was dried in a large Petri-dish in a fumehood under constant agitation and then heat treated at 900° C. for 8 hours in air, thereby partly or fully decomposing the carbonates of the mixture forming a first layered oxide (LO-1). The first layered oxide comprises a mixture of layered phases with an undetectable amount of rock-salt impurity phase.

For the solid material from EXAMPLE 2 comprising only Ni, Mn, and Mg carbonate was mixed thoroughly with a $TiO_2$—$Na_2CO_3$ slurry. The $TiO_2$—$Na_2CO_3$ slurry was prepared by paint-shaking $TiO_2$ and $Na_2CO_3$ in pure ethanol with zirconia balls in the ratio of $TiO_2+Na_2CO_3$ to zirconia balls of 1:5 by weight for 30 min. The mixture was dried in a large Petri-dish in a fumehood under constant agitation and then heat treated at 900° C. for 8 hours in air, thereby partly or fully decomposing the carbonates of the mixture forming a second layered oxide (LO-2). The second layered oxide comprises a mixture of layered phases with a very small amount of rock-salt impurity phase (<1 wt. %).

Electrode slurries were prepared by mixing the first and second layered oxides (A) originating from EXAMPLE 1 and EXAMPLE 2, respectively, as described above with Poly(vinylidene fluoride-co-hexafluoropropylene) (B) as binder and TimCal SuperC65 carbon black (C) as conductive additive in N-Methyl-2-pyrrolidone (NMP) in the ratio A:B:C of 80:10:10. Using a doctor blade, the slurries were distributed onto Al-foil and dried at 80 C. The dry electrode sheets were then cut into circular disks used for the assembly of CR2032 type coin cells employing 0.5 M $NaClO_4$ as electrolyte and Na-metal as the negative electrode. The electrochemical performance of the first layered oxide LO-1 (originating from EXAMPLE 1) is superior to the second layered oxide LO-2 (originating from EXAMPLE 2).

The invention claimed is:

1. A method for the precipitation of a solid material, said method comprising:
   providing an aqueous metal ion solution, said metal ion solution comprising $TiOSO_4$ and metal ions of a metal M, where M is Mn and one or more of the elements: Mg, Co, Cu, Ni, Fe;
   providing an aqueous carbonate solution; and
   mixing said aqueous metal ion solution and said aqueous carbonate solution thereby providing a solid material comprising titanium and a metal carbonate comprising said metal(s) M, where the titanium is homogeneously distributed within the solid material,
   wherein the method is carried out without the use of a chelating agent,
   wherein the pH value of the mixed aqueous metal ion solution and aqueous carbonate solution is 8.5<pH<10.0.

2. A method according to claim 1, where said metal ion solution comprises $Mg^{2+}$ ions and metal ions of a metal M', where M' is one or more of the elements: Co, Cu, Ni, Fe.

3. A method according to claim 1, where M contains Ni, Mn and Mg.

4. A method according to claim 1, where the metal ion solution is prepared from sulfate(s), nitrate(s) or acetate(s).

5. A method according to claim 1, wherein the solid material is precipitated and agglomerated into agglomerated particles, wherein D50 of said agglomerated particles is between 1 and 50 µm.

6. A method according to claim 5, wherein the agglomerated particles are essentially spherical.

7. A method according to claim 5, wherein the agglomerated particles are characterized by an average circularity higher than 0.90 and simultaneously an average aspect ratio lower than 1.50.

8. A method according to claim 1, further comprising the step of:

provinding a NaOH solution and mixing the NaOH solution with the aqueous metal ion solution and the aqueous carbonate solution.

* * * * *